United States Patent
Shankar et al.

(10) Patent No.: US 7,644,106 B2
(45) Date of Patent: Jan. 5, 2010

(54) AVOIDING LOCK CONTENTION BY USING A WAIT FOR COMPLETION MECHANISM

(75) Inventors: Shrikanth Shankar, San Francisco, CA (US); Ramesh Kumar, Foster City, CA (US); Amirali S. Valiani, San Jose, CA (US); Vasudha Krishnaswamy, Fremont, CA (US); Ananth Raghavan, San Francisco, CA (US); Juan R. Loaiza, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 271 days.

(21) Appl. No.: 11/830,538

(22) Filed: Jul. 30, 2007

(65) Prior Publication Data
US 2009/0037417 A1   Feb. 5, 2009

(51) Int. Cl.
   *G06F 17/30* (2006.01)
(52) U.S. Cl. .......................................... 707/201; 707/8
(58) Field of Classification Search ................. 707/101, 707/200, 8, 100, 103 R–103 Z, 201
   See application file for complete search history.

(56) References Cited

U.S. PATENT DOCUMENTS 6,360,228 B1 *   3/2002   Sundara et al. ............. 707/102
6,889,231 B1 *   5/2005   Souder et al. ............. 707/104.1
7,031,974 B1 *   4/2006   Subramaniam ............. 707/102

OTHER PUBLICATIONS

"SQL Processing Concepts" downloaded Sep. 14, 2007 from the Internet < http://download-uk.oracle.com/docs/cd/A57673_01/DOC/server/doc/A48506/sqlconce.htm > 5 pages.
"13 Managing Schema Objects" downloaded from the Internet on Sep. 16, 2009 < http://download.oracle.com/docs/cd/B19306_01/server.102/b14231/ > 26 pages.

* cited by examiner

Primary Examiner—Cheryl Lewis
(74) Attorney, Agent, or Firm—Hickman Palermo Truong & Becker LLP; Daniel D. Ledesma

(57) ABSTRACT

Techniques for avoiding lock contention when processing data definition language (DDL) statements are provided. Some DDL statements modify metadata of a table and then require access to the table. After such a DDL statement modifies the metadata of a table and the updated metadata is made available (i.e., published) to other database statements, execution of the DDL statement is suspended. Data manipulation language (DML) statements acquire locks on the table. In one approach, the locks, of any DML statement, that are granted after the DDL statement is issued are timestamped. The DDL statement uses the timestamps to determine when to access the table. The timestamps are used to determine when the last DML statement (that was pending at the time the modified metadata was published) commits and releases its lock on the table.

16 Claims, 5 Drawing Sheets

AVOIDING LOCK CONTENTION BY USING A WAIT FOR COMPLETION MECHANISM

RELATED APPLICATION

This application is related to U.S. application Ser. No. 11/830,545, filed on Jul. 30, 2007, entitled ONLINE INDEX BUILDS AND REBUILDS WITHOUT BLOCKING LOCKS, the contents of which are incorporated by reference as if fully set forth herein.

FIELD OF THE INVENTION

The present invention relates to database systems and, more particularly, to avoiding lock contention with respect to certain database statements.

BACKGROUND

In database systems, many resources (such as data blocks, tables, indexes) are shared among multiple processes. Even though resources may be shared, many resources may not be used by more than one process at a given time. For example, sometimes, tables stored on a storage medium may be concurrently accessed in some ways (e.g., read) by multiple processes, but accessed in other ways (e.g., written to) by only one process at a time. As a result, mechanisms have been developed to control access to resources.

One such mechanism uses locks. A lock is a data structure that indicates that a particular process has been granted certain rights with respect to a resource. There are many types of locks, some of which may be shared by many processes, while other types prevent any other locks from being granted on the same resource.

A database transaction includes one or more database statements. A database statement that specifies a change to a database object (such as a table or an index) is referred to as a data manipulation language (DML) statement. A database statement that specifies a change to metadata (i.e., at least a portion thereof) of a database object is referred to as a data definition language (DDL) statement. Even though a process acquires and holds a lock, a database statement is also said to acquire and hold a lock.

In high traffic database systems, it is important to allow multiple DML statement s to update a single table concurrently. However, if locks were granted to DML statements on a per-table basis, then only one DML statement would be able to access a table at any instant. Mechanisms have therefore been developed for allowing multiple DML statements to update a single table. DML statements may obtain locks at the granularity of a single row of a table in order to allow other DML statements to concurrently acquire locks on other rows of the table. Such DML statements typically also acquire an object-level lock (e.g., a lock on the entire table) in SX mode (described in more detail below) that prevents other process from acquiring incompatible object-level locks on the same object.

However, some DDL statements require a lock on an entire table. Once issued, such a DDL statement must wait for any DML statements that currently hold locks on individual rows of the table to release their locks before the DDL statement begins. Once the table lock is acquired, any DML statements that require a lock on individual rows of the same table must wait until the DDL statement completes.

FIG. 1 is a graph that illustrates the effect on DML activity that DDL statements typically have when issued. At T1, a DDL statement is issued. Subsequently, the DDL statement must wait until any DML statements that hold locks on any row of the pertinent table have completed. Also, any DML statements (1) that are issued after the DDL statement and (2) that require a lock on any row of the table must wait until the DDL statement is executed and completes.

By T2, all DML statements that were issued before the DDL statement have completed. Also at T2, the DDL statement begins executing. As part of its execution, the DDL statement acquires a lock on the table. At T3, the DDL statement completes and releases the lock on the table. The period between T3 and T4 indicates an increase in DML activity above the "normal" threshold in order to process the DML statements that were blocked on the DDL statement. In high traffic websites with online databases, the "dip" (i.e., between T1 and T3) in DML activity is unacceptable because the "dip" indicates that some users are waiting longer for database statements to complete than such users normally would wait. Thus, overall user experience suffers, which may result in some users choosing to visit other websites. Furthermore, a database system might not have enough resources to process the backlogged DML statements in addition to the DML statements that are received in the normal course of business. This lack of resources may cause additional delays in processing the DML statements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
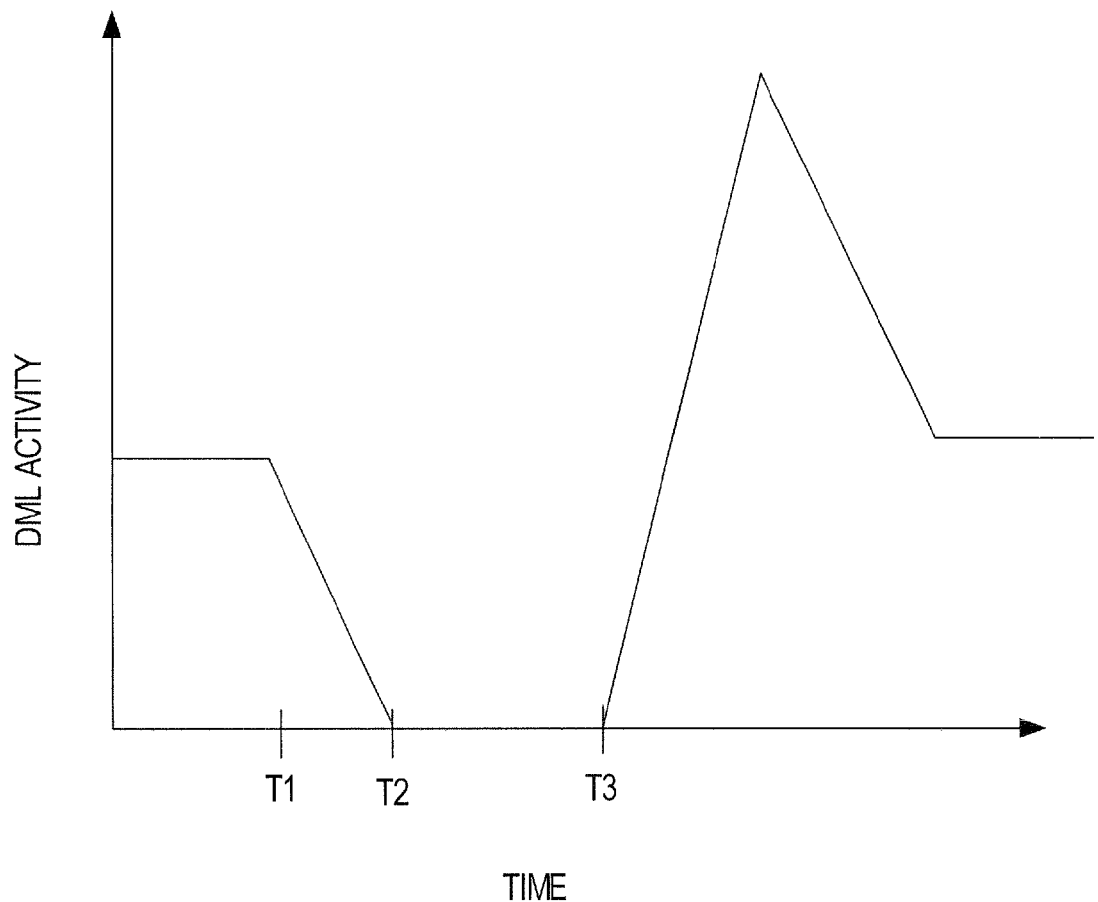
FIG. 1 is a graph that illustrates the effect on DML activity that DDL statements typically have when issued.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for processing DDL statements in at least three phases in order to avoid lock contention with DML statements. In the first phase, one or more processes that execute the DDL statement modify metadata of a particular table without first acquiring a conflicting lock on the particular table. The one or more processes publish the modification so that the modification is available to other processes processing other transactions. In the second phase, the DDL statement waits until any transactions that were pending when the metadata was modified (and, optionally, that hold a lock on the particular table) release their lock. In the third phase, the particular table is scanned. By dividing the processing of a DDL statement into at least three phases, at least two benefits may be realized. First, the DDL statement is not blocked on any previously issued DML statements. Second, DML statements that are issued subsequent with respect to the DDL statement are not blocked on the DDL statement.

Types of Locks

There are numerous types of locks that may be granted with respect to a particular resource, such as a database object. One type of lock is a shared (S) lock. An S lock on a table grants a process permission to read the table and guarantees that other processes cannot write to the table; however, the S lock does not guarantee that other processes cannot read the table.

Another type of lock is an exclusive (X) lock. An X lock on a table grants a process permission to read from and write to a table and guarantees that other processes cannot read from or write to the table.

Another type of lock is a shared-exclusive (SX) lock. An SX lock on a table grants multiple processes permission to read from and write to the table, but prevents S locks and X locks from being granted on the table. A common scenario in which a SX lock is used is when multiple processes are affecting different rows of the same table.

Types of Database Statements

The two types of database statements described previously are data manipulation language (DML) statements and data definition language (DDL) statements. Non-limiting examples of DML statements include INSERT, UPDATE, and DELETE. Non-limiting examples of DDL statements include CREATE, DROP, and ALTER. A DML statement modifies a database object, such as by inserting rows in a table, while a DDL statement defines a database object, such as by adding a column to a table or dropping a partition.

Multiple DML statements are usually included in a single database transaction, whereas a database transaction that includes a DDL statement usually includes no other types of database statements. A database transaction that includes a DDL statement is referred to hereinafter as a "DDL transaction." A database transaction that includes one or more DML statements is referred to hereinafter as a "DML transaction."

The processing of a database statement typically entails parsing (or compiling) the database statement and then executing the database statement. One or more processes that parse and/or execute a database statement usually acquire locks while the database statement is processed. Such locks on database objects (or portions thereof) are typically held until the corresponding database transaction commits, at which time the locks are released. However, a database transaction may release a lock before the transaction commits if the transaction "knows" that no subsequent database statement in the corresponding database transaction will require the lock.

As stated previously, although a database statement is simply a statement and, thus, is incapable of performing any function, the discussion hereinafter says, for purposes of brevity, that a database statement (or a database transaction) performs some function relative to a lock. For example, "a database statement acquires a lock" is shorthand for "one or more processes that process a database statement acquire a lock." Similarly, "a database transaction acquires a lock" is shorthand for "one or more processes that process a DML transaction acquire a lock."

Multiple types of DDL statements may be used in various embodiments of the invention. Non-limiting examples of such DDL statements include a database statement that updates (e.g., adds or modifies) a constraint, a database statement that creates a snapshot of a database object, and a database statement that creates a materialized view log.

A constraint limits the values stored in a database object. For example, a NOT NULL constraint prohibits a value from being NULL. As another example, a UNIQUE constraint prohibits multiple rows of a table from having the same value in the same column or combination of columns. As yet another example, a constraint may limit the values in a SALARY column of an EMPLOYEE table to be only values greater than zero.

A snapshot indicates a point in time associated with an object. With a snapshot, the state of an object (e.g., a table) as of the indicated point in time may be returned.

Although techniques described herein may be applied to varying types of database objects, the following examples are provided in the context of updates to tables and the metadata associated with those tables.

Two-Phase Processing of DDL Transactions

Figure 2A:
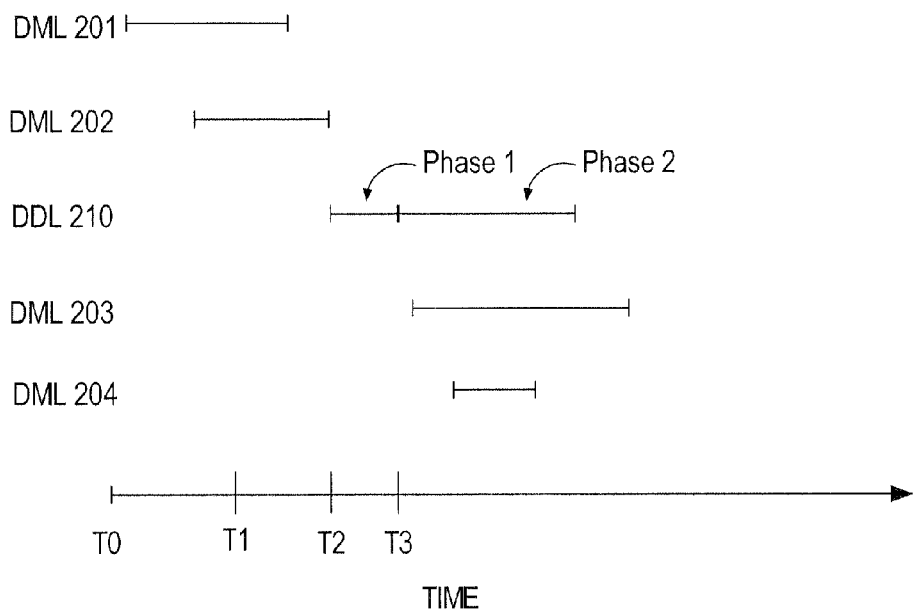
FIGS. 2A-B are diagrams that illustrate, respectively, a two-phase approach for processing DDL statements and that approach's possible effect on DML activity with respect to a particular table.

One approach for decreasing the time that multiple DML transactions are blocked is to process a DDL transaction in two phases. FIG. 2A is a diagram that illustrates a two-phase approach for processing DDL transactions. In FIG. 2A, four DML transactions (DML 201-204) and one DDL transaction (DDL 210) are illustrated. The lines indicating the start and end of each DML transaction indicate the boundaries of the processing of the DML transaction, and not necessarily when the DML transaction was issued. Also, each DML transaction is part of its own database transaction. Each DML transaction may represent multiple DML transactions of the same database transaction. DDL 210 may represent multiple DDL transactions of the same database transaction.

In FIG. 2A, DML 201 and DML 202 are issued before T1. At T1, DDL 210 is issued. Because DML 201 and DML 202 may hold locks that are incompatible with a lock that DDL 210 is requesting, DDL 210 may be blocked (i.e., may be required to wait) until T2 to execute. Phase 1 of FIG. 2A indicates a period in which DDL 210 acquires a (e.g., X) lock on the metadata of the table and modifies the metadata (e.g., by adding a constraint). During phase 1, all database transactions that require locks on the metadata are blocked on DDL 210 (i.e., all DML transactions must wait until DDL 210 releases its lock on the metadata). Such database transactions are referred to hereinafter as "unsafe transactions." For example, DML 203 may have been issued shortly after T1 or T2 but must wait until after T3 to be parsed and executed.

At T3, the DDL 210 releases its lock on the metadata, marking the end of phase 1. By releasing the lock, the changes to the metadata are available for other processes. After T3, DML 203 and DML 204, when they each acquire a (S) lock on the metadata in order to read the metadata, are able to see the update to the metadata (e.g., updated constraint) that execution of DDL 210 caused. For example, if DDL 210 is an update constraint DDL transaction, then DML 203 and DML 204 enforce the updated constraint.

At T3, after DDL 210 releases the lock, phase 2 begins. Phase 2 entails scanning (at least a portion of) the table associated with the metadata modified by execution of DDL 210. For example, if DDL 210 specified that a new constraint on a SALARY column of an EMPLOYEE table is that salaries must be greater than or equal to 0, then phase 2 involves one or more processes scanning the SALARY column of each row of the EMPLOYEE table in order to ensure that the constraint is satisfied.

Scanning a table, especially one that is terabytes in size, typically requires a much longer time to process than updating the metadata of the table. Thus, phase 2 is generally much longer in time than phase 1. By splitting up a DDL transaction into two phases, unsafe transactions are blocked for less time than in previous implementations that do not include two phases.

Figure 2B:
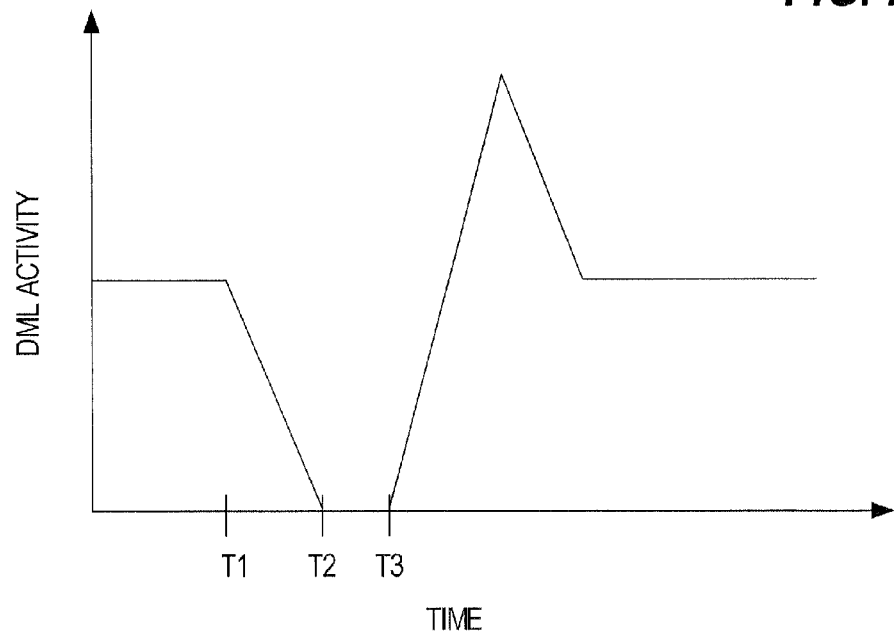

To illustrate, FIG. 2B is a diagram that illustrates the effect that the two-phase approach has on DML activity with respect to a particular table. In both FIGS. 1 and 2B, the time between T1 and T3 is the time that unsafe transactions are blocked. The time between T1 and T3 in FIG. 1 is much longer than the time between T1 and T3 in FIG. 2B because unsafe transactions in FIG. 1 are also blocked during the scanning of the table, and not just during the update of the metadata.

Three-Phase Processing of DDL Transactions

According to an embodiment of the invention, the execution of a DDL transaction is divided into at least three different phases. Dividing a DDL transaction's execution into these phases eliminates the requirement to block any unsafe transactions (i.e., DML transactions that are issued subsequent to the issuance of the DDL transaction). DDL transactions are not required to acquire a lock on the metadata of a table. DDL statements may still acquire a lock on the table; however, any lock on the table is in a mode that is compatible with table locks that DML statements acquire, such as in SX mode.

In one embodiment, the table locks acquired by all transactions are timestamped. In a related embodiment, only those table locks that are acquired on the same table whose metadata is modified by the DDL transaction are timestamped. The timestamped locks are used by the DDL transaction to determine when to begin the phase of the DDL transaction in which the table is scanned.

Figure 3:
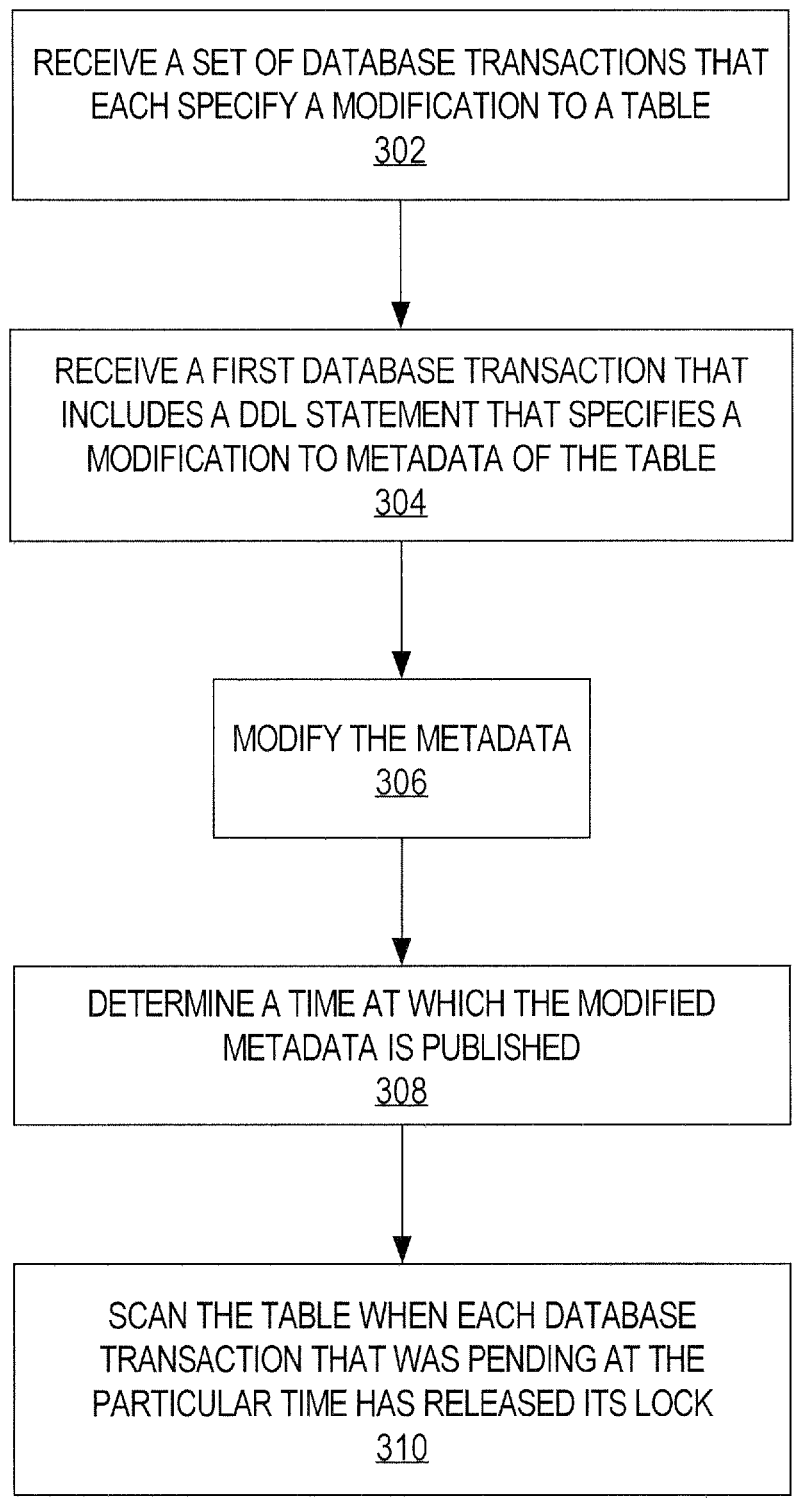
FIG. 3 is a flow diagram that illustrates a three-phase approach for processing DDL statements, according to an embodiment of the invention.

FIG. 3 is a flow diagram that illustrates an approach for processing DDL transactions, according to an embodiment of the invention. At step 302, a database server (or one or more processes of the database server) receives a set of database transactions. Each database transaction of the set specifies a modification to a table. At step 304, the database server receives a first database transaction that includes a DDL statement that specifies a modification to metadata of the table. At step 306, the metadata is modified and published. At step 308, the database server determines a time at which the modified metadata is published. At 310, the database server scans the table when any pending database transactions, at the particular time, release their respective locks on the table.

Figure 4A:
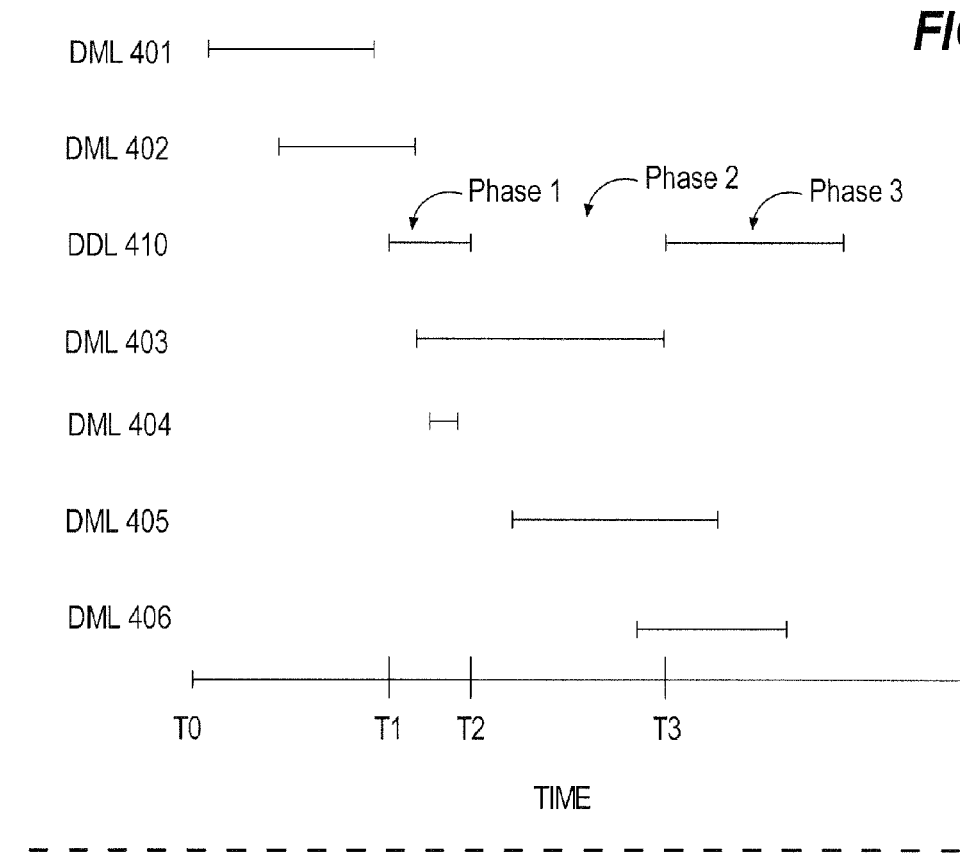
FIGS. 4A-B are diagrams that illustrate, respectively, a three-phase approach for processing DDL statements and that approach's possible effect on DML activity with respect to a particular table, according to an embodiment of the invention.

FIG. 4A is a diagram that illustrates a three-phase approach for processing DDL transactions, according to an embodiment of the invention. In FIG. 4A, six DML transactions (DML 401-406) and one DDL transaction (DDL 410) are illustrated. As in FIG. 2A, the lines in FIG. 4A indicating the start and end of each DML transaction indicate the processing of the DML transaction, and not necessarily when that DML transaction was issued.

In FIG. 4A, DML 401 and DML 402 are issued before T1. At T1, DDL 410 is issued. Even though DML 401 and DML 402 may each hold a lock that is incompatible with a lock that DDL 410 may normally request, DDL 410 is not blocked and may execute promptly without waiting for any other transactions to commit and/or release their respective locks. Phase 1 of FIG. 4A indicates a period in which DDL 410 acquires a metadata lock and modifies the metadata (e.g., by adding a constraint).

In contrast to the two-phase approach described previously, DML transactions may begin executing on the table. In one embodiment, each DML transaction that begins executing during phase 1 and acquires a lock on the table has a timestamp associated with the table lock. The timestamp indicates a time at which the lock was granted to the DML transaction. A lock held by a DML transaction may be a table SX lock, which enables multiple DML transactions to modify a single table concurrently. Thus, in FIG. 4A, at least the locks acquired by DML 403 and DML 404 are timestamped. A locking mechanism of a database system may timestamp all locks regardless of whether a DDL transaction has issued.

At T2, DDL 410 completes phase 1. Phase 1 completes when the updated metadata is published, i.e., when the metadata is available for other processes to see. Thus, any DML transactions that begin processing after the end of phase 1 are able to see the update to the metadata (e.g., updated constraint) that execution of a DDL transaction caused. According to FIG. 4A, DML 405 and DML 406 are able to see the update to the metadata that execution of DDL 410 caused. For example, if DDL 410 is an update constraint DDL transaction, then DML 405 and DML 406 enforce the updated constraint.

The completion of phase 1 marks the beginning of phase 2. The length of phase 2 may vary significantly from one issued DDL transaction to another issued DDL transaction, depending on how many DML transactions were pending at the end of phase 1 (i.e., at T2 in this example). The last DML transaction, from the group of DML transactions that were pending at the beginning of phase 2 (i.e., the unsafe transactions), to release its lock on the pertinent table marks the end of phase 2. According to FIG. 4A, DML 403 is the last "unsafe transaction." At T3, DML 403 commits and releases its lock, which marks the end of phase 2 and the beginning of phase 3.

In FIG. 4A, phase 3 entails scanning (at least a portion of) the table associated with the metadata modified by execution of DDL 410. Because of phase 2, all DML transactions that are executing during phase 3 are ensured to see the changes to the metadata caused by execution of DDL 410. In FIG. 4A, such DML transactions are DML 405 and DML 406. If DDL 410 is an update constraint transaction, then DML 405 and DML 406 enforce the constraint. Additionally, phase 3 does not require a lock on the table. Scanning the table ensures that even the changes made to the table by DML 401-404 are eventually verified, e.g., against the updated constraint, in phase 3

Figure 4B:
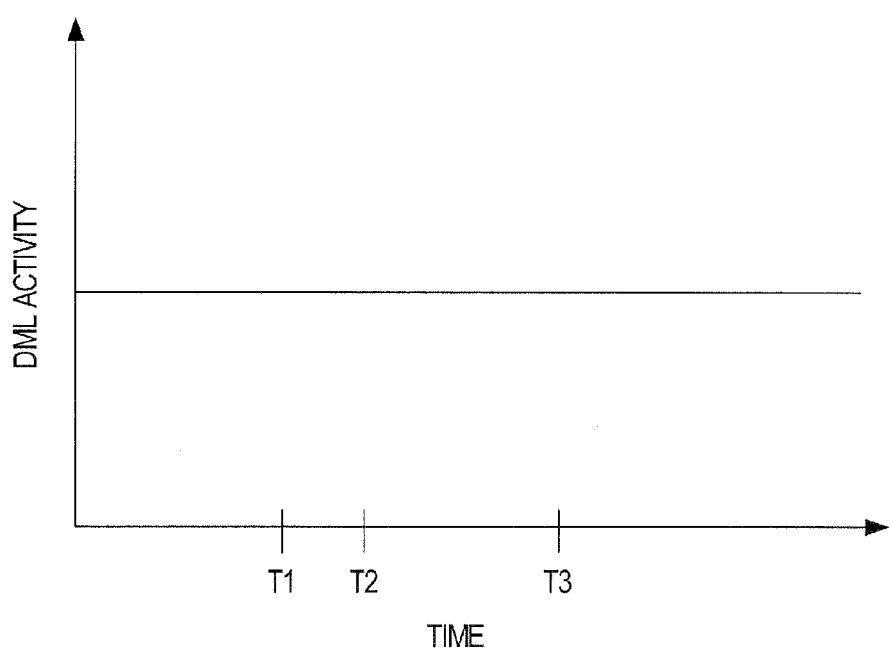

By splitting up a DDL transaction into three phases and timestamping the locks acquired by each unsafe transaction, the DML activity on a table is not affected by the execution of a DDL transaction that specifies an update to metadata of the table. To illustrate, FIG. 4B is a diagram that illustrates the effect that the three-phase approach has on DML activity, which effect may be (almost) nothing, other than the processing power required to execute a DDL transaction. Not only is the DDL transaction not blocked on previously issued DML transactions, but none of the DML transactions that are processed concurrently with the DDL transaction are blocked on the DDL transaction.

Hardware Overview

Figure 5:
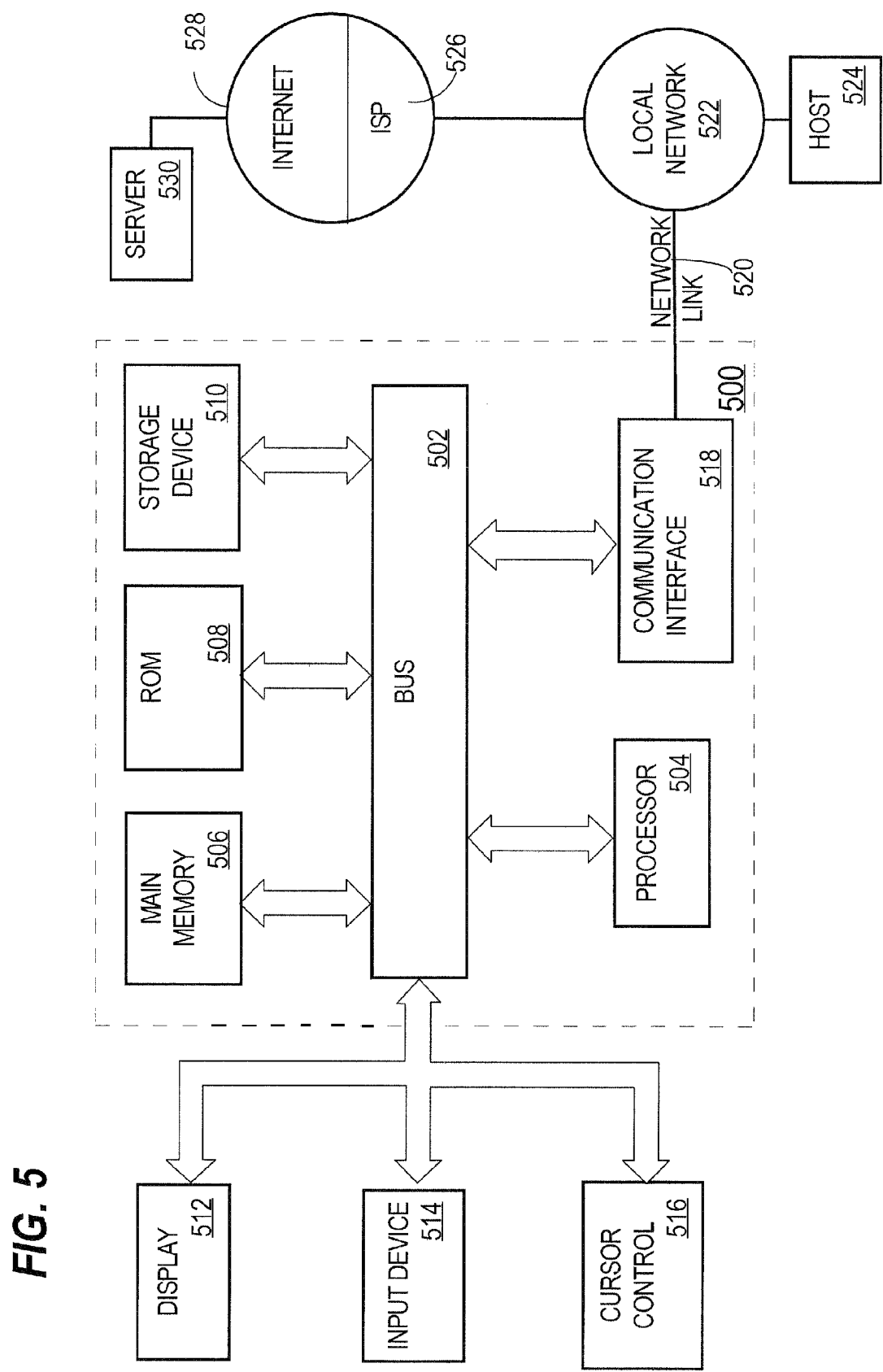
FIG. 5 is a block diagram of a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing data definition language (DDL) statements, comprising:
   receiving a first database transaction that includes a DDL statement that specifies a modification to metadata of a database object;
   based on the DDL statement:
      modifying the metadata;
      determining a particular time at which the modified metadata is available for one or more processes, that execute one or more database transactions other than the first database transaction, to read; and
      after determining the particular time, waiting to read at least a portion of the database object until each database transaction in a set of one or more database transactions that were pending at the particular time has committed.

2. The method of claim 1, wherein each database transaction in the set of one or more database transactions specifies a modification to the database object.

3. The method of claim 1, further comprising:
   for each database transaction of the set, associating a timestamp with a lock that said each database transaction acquires on at least a portion of the database object; and
   for each lock, determining whether the timestamp associated with said each lock is less than the particular time.

4. The method of claim 1, wherein:
   the modification to the metadata specifies a constraint that is to be associated with certain values of the database object; and
   reading at least a portion of the database object includes reading the database object to verify whether the certain values of the database object satisfy the constraint.

5. The method of claim 1, wherein the modification to the metadata specifies an instruction to create a snapshot of the database object.

6. The method of claim 1, wherein the database object is one of a table or an index.

7. The method of claim 1, further comprising:
   receiving a second database transaction before receiving the first database transaction, wherein the second database transaction specifies a modification to the database object, wherein the second database transaction has not committed when the first database transaction is received; and
   executing the first database transaction without waiting for the second database transaction to commit.

8. The method of claim 1, further comprising:
   receiving a second database transaction after receiving the first database transaction, wherein the second database transaction specifies a modification to the database object, wherein the first database transaction has not committed when the second database transaction is received; and
   executing the second database transaction without waiting for the first database transaction to commit.

9. One or more storage media storing instructions for processing data definition language (DDL) statements, wherein the instructions, when executed by one or more processors, cause:
   receiving a first database transaction that includes a DDL statement that specifies a modification to metadata of a database object;
   based on the DDL statement:
      modifying the metadata;
      determining a particular time at which the modified metadata is available for one or more processes, that execute one or more database transactions other than the first database transaction, to read; and
      after determining the particular time, waiting to read at least a portion of the database object until after each database transaction in a set of one or more database transactions that were pending at the particular time has committed.

10. The one or more storage media of claim 9, wherein each database transaction in the set of one or more database transactions specifies a modification to the database object.

11. The one or more storage media of claim 9, wherein the instructions, when executed by the one or more processors, further cause:
   for each database transaction of the set, associating a timestamp with a lock that said each database transaction acquires on at least a portion of the database object; and
   for each lock, determining whether the timestamp associated with said each lock is less than the particular time.

12. The one or more storage media of claim 9, wherein:
   the modification to the metadata specifies a constraint that is to be associated with certain values of the database object; and
   reading at least a portion of the database object includes reading the database object to verify whether the certain values of the database object satisfy the constraint.

13. The one or more storage media of claim 9, wherein the modification to the metadata specifies an instruction to create a snapshot of the database object.

14. The one or more storage media of claim 9, wherein the database object is one of a table or an index.

15. The one or more storage media of claim 9, wherein the instructions, when executed by the one or more processors, further cause:
   receiving a second database transaction before receiving the first database transaction, wherein the second database transaction specifies a modification to the database object, wherein the second database transaction has not committed when the first database transaction is received; and
   executing the first database transaction without waiting for the second database transaction to commit.

16. The one or more storage media of claim 9, wherein the instructions, when executed by the one or more processors, further cause:
   receiving a second database transaction after receiving the first database transaction, wherein the second database transaction specifies a modification to the database object, wherein the first database transaction has not committed when the second database transaction is received; and
   executing the second database transaction without waiting for the first database transaction to commit.

* * * * *

UNITED STATES PATENT AND TRADEMARK OFFICE
CERTIFICATE OF CORRECTION

PATENT NO. : 7,644,106 B2  Page 1 of 1
APPLICATION NO. : 11/830538
DATED : January 5, 2010
INVENTOR(S) : Shrikanth Shankar et al.

It is certified that error appears in the above-identified patent and that said Letters Patent is hereby corrected as shown below:

In column 6, line 59, after "3" insert -- . --.

Signed and Sealed this

Fourteenth Day of September, 2010

David J. Kappos
*Director of the United States Patent and Trademark Office*